O. C. KNIPE.
METHOD OF AND APPARATUS FOR ELECTRIC WELDING AND ARTICLE PRODUCED THEREBY.
APPLICATION FILED DEC. 20, 1912.
1,115,943.
Patented Nov. 3, 1914.
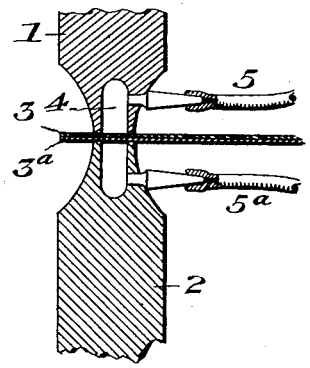
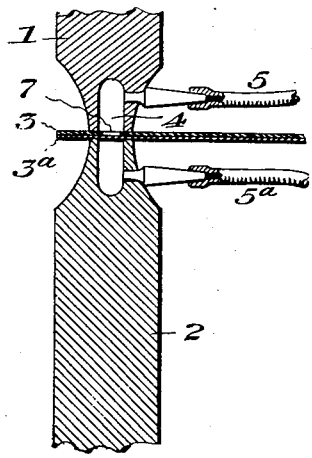
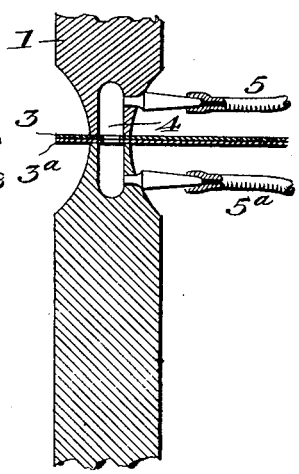
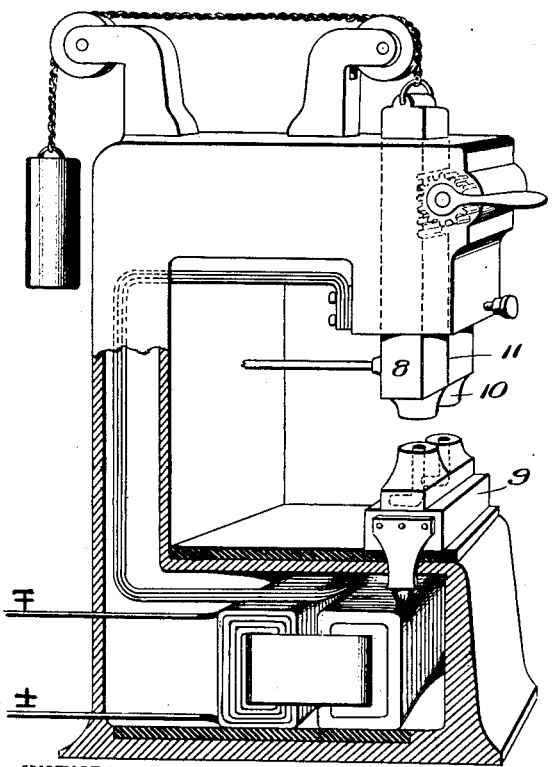
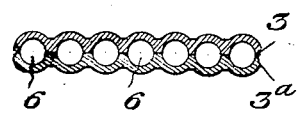
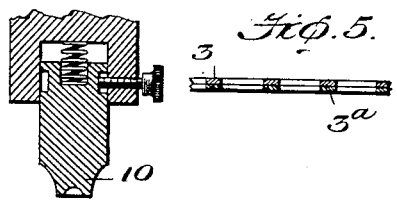
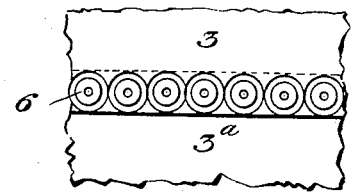
WITNESSES
INVENTOR
Oliver C. Knipe
by Robt. Read
Attorney

UNITED STATES PATENT OFFICE.

OLIVER C. KNIPE, OF PALO ALTO, CALIFORNIA.

METHOD OF AND APPARATUS FOR ELECTRIC WELDING AND ARTICLE PRODUCED THEREBY.

1,115,943.  Specification of Letters Patent.  Patented Nov. 3, 1914.

Application filed December 20, 1912. Serial No. 737,863.

*To all whom it may concern:*

Be it known that I, OLIVER C. KNIPE, a citizen of the United States, and resident of Palo Alto, in the county of Santa Clara and State of California, have invented new and useful Improvements in Methods of, Apparatus for Electric Welding, and Articles Produced Thereby, of which the following is a specification.

This invention relates to electric welding, the object being to improve the character of the joint by preventing defective metallic union of the two parts due to imprisoned air or other gases extruded by the heat of the welding operation, and particularly to permit the welds to be made on thin sheet-metal stock without damage to its finish or strength.

In welding by the method in commercial use the parts to be welded are clamped in copper terminals and brought into contact under pressure, and where the abutting surfaces engage the joint resistance gives the necessary potential drop to create a welding heat; as soon as the metal softens the parts begin to unite molecularly, if free from oxids, and where the heat is greatest metallic union is first effected,—that is to say at the center where the heat has the least opportunity to escape. It therefore follows that if the current is maintained a sufficient time to weld the outer parts of the joint, the center parts are fluid and are apt to be overheated or burned, with the formation of scoria, which weakens the joint by mechanically interfering with a bond which is homogeneous throughout the entire cross-section of the joint. Moreover, the imprisoned air is highly heated and bursts through the softened metal to the outer air with the formation of blowholes or rough spots. A further result follows from the improved conductivity as the joint nears completion, which lowers the joint resistance at the weld, correspondingly increasing the resistance and heat at the clamp, which means arcing and fusions where they are not desired. This is a matter of serious importance where welds are made between plates or metal sheets, where union may be wanted at a special point or edge, and the difficulties noted make it especially hard to weld thin sheet-metal without damaging the texture or finish of the material.

I proceed in a different manner by rendering the heating more equable throughout the area to be welded by using a light pressure to increase the relative potential drop at the weld, and by facilitating the removal of the imprisoned air or gases, and by preventing the formation of scoria. I further promote these results by using tubular terminals whereby the parts to be joined are pressed lightly into contact along an annular surface which gives a larger joint with the same heat, since the heat from the central part does not accumulate disproportionally and is therefore more equably distributed; and I apply a neutral or reducing gas through the terminal to prevent oxidation, thus avoiding both overheating and defective union at the center until all parts of the sectional area are at a welding temperature. I prefer, when a welding heat is reached, to increase the pressure on the terminals, which extrudes or upsets metal in the hollow spaces in said terminals and permits the united surfaces to come snugly together. Whenever possible with a view to the ultimate use of the article welded, I prefer to punch or drill holes in one or both the plates to be united, in order to provide easier escape for the gases and to further reduce the accumulation of heat at the center of the weld. With metals which harden under air-cooling I prefer to follow the formation of a weld by annealing the joint by slow cooling, which may be effected by bringing an auxiliary terminal into contact with the joint and either passing a weak current through it or placing it in such juxtaposed relation to the welding terminal that it will absorb heat enough to hold a previously made weld from sudden cooling. A further important feature of my procedure results from the method by which I apply the current. I do this in the manner set forth in my previous Patent No. 1,006,103, that is to say I employ a current of greater amperage than usual and apply it for a shorter period of time, so that the weld is made practically instantaneously instead of by a slowly augmenting heat as usual. I thereby avoid a transfer of heat from the joint to adjacent parts of the plates or surfaces, thus preventing scaling or tarnishing of the metal.

My invention therefore comprises a method of electric welding which consists in heating along annular areas to equalize the heat throughout the joint, with or without the removal of metal from the center of either or both of the plates, and preferably in the presence of a neutral or reducing gas.

It further consists in making a series of welds and enforcing a slow cooling of the joints while a second weld is being made.

It further consists in welding under light pressure by means of hollow terminals, and increasing the pressure when a welding heat is attained to bring the welded plates to coincident planes, or nearly so, and permit extrusion of the joint to occur on the outside.

It comprises also a method of providing for the removal of imprisoned, pocketed, or entrapped air by giving it a direct and easy path of escape.

It comprises also other features as well as novel means for carrying them out, which will be hereinafter fully described and will be definitely pointed out in the claims.

In the accompanying drawings which illustrate the invention, Figure 1 shows diagrammatically a method of carrying out my invention with thin unperforated plates, the scale of thickness of the latter being exaggerated for clearness of illustration; Fig. 2 shows a similar view with a single plate perforated; Fig. 3 a similar view with both plates perforated; Fig. 4 shows a cross-sectional view greatly exaggerated in size of a row of welds forming a welded seam; Fig. 5 shows two assembled plates face to face with holes in register; Fig. 6 shows a top plan of a line of consecutive welds on a lapped seam; Fig. 7 shows a side elevation of a welding machine suitable to use with my invention; and Fig. 8 shows a sectional detail of an annealing cup.

1 and 2 represent two terminals or electrodes of a welding transformer, and 3, 3ª two thin plates of sheet metal to be welded together; these sheets are shown exaggerated in thickness for clearness of illustration; my invention is useful also with thicker metal stock but it is of especial advantage with thin stock for the reason that the current commercial methods of electric welding do not give satisfactory results with thin stock, whereas I can successfully operate with sheet metal a few mils in thickness. The electrodes are reduced in section at the tips and are put under light pressure in circuit with a current of large amperage, for which I prefer to use a large transformer with plenty of iron in its core; or if standard sizes of transformers are used a battery or group of transformers connected in multiple may be used. The current is applied for a very much shorter interval than usual in standard welding practice, as the weld is a mere flash, but by reason of the great volume of the current and its practically instantaneous application the heat is localized strictly to the line of engagement of the terminals with the plates, as there is no time given because of the specific heat of the metals which requires sensible time to effect a rise of temperature, for heat transmission by conduction to the parts of the plates adjacent to the weld. It is by reason of this flash welding that no discoloration or oxidation of the plates can occur, and when the weld is completed the bright finish left by the rolls used in manufacturing the plates is not marred. To secure a good appearance at the point where fusion or plasticity occurs, and where the heat is raised to a point where oxidation would result ordinarily, I make the terminals contracted to increase the current density at the point of contact, and thus raise the amperage relatively to the body of the terminal, and in addition I make them hollow as indicated at 4, which not only affords easy escape for the gases but prevents disproportionate increase of temperature near the inner parts of the contact. I also lead to the hollow chamber in the terminals a neutral gas such as nitrogen or a reducing gas such as hydrogen or carbon monoxid by supply pipes 5, 5ª to the end that the parts raised to a bright heat can form no scoria, and will be kept free from scale or tarnish. The duration of the current may be determined automatically in known ways, or the workman may from prior experience with the specific heat of the metal operated on and its particular gage of stock predetermine the proper speed of operation of the control switch. After a weld has been made and while the metal at the weld is still soft the pressure on the electrode is increased, forcing the sheets into close contact; the expanded metal swells into the hollow terminal and causes an extruded hump 6, 6, whereas the joint between the plates is squeezed almost or quite into coincidence with the plane of the merged surfaces.

In Fig. 2 one of the sheets is perforated with small holes, as at 7; this gives increased freedom of exit to the air or other gases expelled from the metal itself, or from the joined surfaces between the two plates.

In Fig. 3 both plates are perforated, and where it is not objectionable in the welded product, as where no watertight requirements are to be met, this is to be preferred, as it insures perfect freedom for the exit of trapped or pocketed air and results in a more perfect joint. Such air under the high heat, if not provided with a free exit, will cause blowholes and rough spots. The fused metal will tend to contract the hole, giving the weld a very neat finish,—see Fig. 6.

In Fig. 4 is shown a line of welds made in succession one at a time on imperforate sheets. The metal under the hollow terminal softens and the film of air beneath swells it out into a hollow hump around each joint.

Fig. 5 shows two punched plates assembled for a weld as they are introduced to the welder; Fig. 4 shows a cross-section through a line of welds; and Fig. 6 shows a series of contiguous welds made on two lapped perforated sheets as in Fig. 3.

When both sheets are perforated the hollow terminals by reason of the pressure put on them when the metal is softened cause a circular ridge or projection the metal joint being squeezed or compacted at the joint in a circular depression, as indicated in Fig. 6.

In Fig. 7 I have shown a welder with a handle and gearing to shift a movable terminal 8 into active engagement with the work, which is assembled on the bed-plate 9. I have not shown a supply current and switching apparatus, as this may be of the usual kind for hand-operated work, the only difference being that as the circuit in my case is closed for so short a period, the switch must be quick acting, whether hand or automatically operated. In order to anneal the joint, if required, a cap 10 may be insulated by mica at 11 from the terminal, so as to be in fairly good thermal relation to it, but insulated electrically; this is mounted so as to yield when the terminal is put under pressure, see Fig. 8; it is hollow, so as to surround like a cap a completed weld and keep it from chilling. The heat drawn from the main terminal will ordinarily be sufficient to keep the interior hot enough, but if desired it may be heated electrically in known ways. When the work is shifted after a weld, the hot cup covers the weld previously completed and the metal cools slowly, thereby keeping it soft and tough.

Having thus described my invention, what I claim as new and desire to secure by Letters-Patent is:—

1. The method of electric welding consisting in bringing the parts to be united into contact and applying an electric current to an annular contact area inclosing an unconfined gaseous space to equalize the heat at all points of the joint.

2. The process of electric welding consisting in bringing two sheets to be united into contact, applying an electric current to two annular contact areas inclosing an unconfined gaseous space at opposite sides of the sheets to equalize the heat at all parts of the joint.

3. The method of electric welding consisting in bringing two parts to be united into contact, applying an electric current through two perforated electrodes at opposite sides of the sheets to equalize the heat at all parts of the joint, and simultaneously applying a non-oxidizing atmosphere to the space within the electrodes.

4. The method of electric welding and producing an annular joint consisting in bringing two sheets to be united into contact and applying an electric current transversely to an opening in at least one of the sheets to equalize the heat distribution and permit free exit of the trapped air.

5. The method of electric welding and producing an annular joint consisting in bringing two perforated metallic sheets into contact with the perforations in register, and applying an electric current to an annular contact area transversely at the margins of the perforations.

6. The method of electric welding consisting in bringing two perforated metallic bodies into contact with the perforation in register, applying an electric current transversely at the margins of the perforations, and simultaneously applying a non-oxidizing atmosphere at the welding area.

7. The method of electric welding consisting in bringing two perforated metallic bodies into contact with the perforations in register, applying an electric current transversely at the margins of the perforations, and simultaneously applying a heat conducting, reducing atmosphere at the welding area.

8. The method of electric welding consisting in bringing two thin metal sheets into contact face to face, and applying transversely a welding electric current along an annular contact area with adjacent unconfined gaseous space.

9. The method of electric welding consisting in bringing two thin metal sheets into contact face to face, and applying transversely through the sheets a welding current over an annular contact area with adjacent unconfined gaseous space containing a neutral gas to equalize the accumulation of heat throughout the area of the weld.

10. The method of electric welding consisting in bringing two thin perforated metal sheets into contact with the perforations in register, passing a welding electric current transversely through the walls of the perforations at annular contact areas with adjacent unconfined gaseous space to equalize the distribution of the heat throughout the terminals by which it is applied.

11. The method of making an electrically welded seam consisting in bringing two sheets of metal having contiguous holes face to face with the holes in register, and passing a welding current through an annular contact area with adjacent unconfined gaseous space in a transverse direction through the sheets around the walls of the holes.

12. The method of electric welding consisting in bringing two metal sheets into light contact whereby air is allowed to escape, applying a welding current transversely over an annular contact area with adjacent unconfined gaseous space, and increasing the contact pressure when a welding heat is attained.

13. The method of electric welding consisting in bringing two metal sheets into contact, applying current transversely at opposite sides of the assembled sheets over annular contact areas with adjacent unconfined gaseous space, and applying a welding current of such amperage as to effect a flash weld, whereby the parts are united by a homogeneous joint without blemish to the surface of the sheets.

14. The method of electric welding consisting in bringing two metal bodies into contact along a definite length, applying transversely at opposite sides of the assembled bodies a welding electric current confined to opposing annular contact areas, shifting the bodies after a weld has been made; covering the welded joint with insulation to anneal it, making another weld at an adjacent point, and repeating these operations consecutively until a series of welds is completed.

15. In an electric welder, the combination of two hollow terminals of annular contact area with adjacent unconfined gaseous space said terminals adapted to engage bodies to be welded on opposite sides, at least one of said bodies being perforated to permit escape of air and effect an improved weld, and means for actuating the terminals.

16. In an electric welder, the combination of two cupped terminals of annular contact area with adjacent unconfined gaseous space adapted to engage bodies to be welded on opposite sides, said bodies having coincident holes in alinement with the terminals to permit escape of air and effect an improved weld, and means for actuating the terminals.

17. In an electric welder, the combination of two hollow terminals of annular contact area adapted to engage bodies to be welded on opposite sides, whereby an annular joint is produced between the bodies, means for actuating the terminals and means for simultaneously applying a nonoxidizing gas to the joint.

18. In an electric welder, the combination of two hollow terminals of annular contact area adapted to engage bodes to be welded on opposite sides, whereby an annular welded joint is produced between the bodies, means for actuating the terminals and means for increasing the pressure at the terminals when the joint attains a welding heat.

19. In an electric welder, the combination of two hollow terminals of annular contact area adapted to engage bodies to be welded on opposite sides, whereby an annular joint is produced between the bodies, means for actuating the terminals and a hot annealing cover adapted to be applied to the weld immediately after completion.

20. The hereindescribed electrically welded product distinguished by a line of electric welds between two sheet metal bodies consisting of closely adjacent projections extruding from at least one surface, the inner surfaces lying in substantially coincident planes.

OLIVER C. KNIPE.

Witnesses:
ROBT. H. READ,
G. M. COPENHAVER.